(12) United States Patent
Tagami

(10) Patent No.: US 12,475,922 B1
(45) Date of Patent: Nov. 18, 2025

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Naoki Tagami, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/929,389

(22) Filed: Oct. 28, 2024

(30) Foreign Application Priority Data

May 20, 2024 (JP) ................... 2024-081566

(51) Int. Cl.
*G11B 5/596* (2006.01)

(52) U.S. Cl.
CPC ............... *G11B 5/59627* (2013.01)

(58) Field of Classification Search
None
See application file for complete search history.

(56) References Cited

U.S. PATENT DOCUMENTS

| | | | |
|---|---|---|---|
| 6,498,694 B1 * | 12/2002 | Shah ............... | G11B 11/10576 |
| 6,504,668 B1 * | 1/2003 | Takeuchi ......... | G11B 5/59627 360/77.04 |
| 6,707,635 B1 * | 3/2004 | Codilian ........... | G11B 5/59627 360/77.02 |
| 7,123,433 B1 * | 10/2006 | Melrose ............ | G11B 5/59627 360/75 |
| 7,151,645 B2 | 12/2006 | Won et al. | |
| 7,773,334 B1 * | 8/2010 | Rutherford ....... | G11B 5/59633 360/75 |
| 8,953,271 B1 * | 2/2015 | Chayarangkan ... | G11B 5/59627 360/77.04 |
| 9,349,400 B1 * | 5/2016 | Dhanda ............. | G11B 5/59627 |
| 10,607,645 B1 * | 3/2020 | Hamaguchi ......... | G11B 5/5552 |
| 11,790,949 B2 | 10/2023 | French et al. | |
| 2008/0267029 A1 * | 10/2008 | Miles ................. | G11B 5/455 |
| 2015/0055239 A1 | 2/2015 | Hara | |

(Continued)

FOREIGN PATENT DOCUMENTS

JP 2022-051394 3/2022

*Primary Examiner* — Peter Vincent Agustin
(74) *Attorney, Agent, or Firm* — Knobbe, Martens, Olson & Bear, LLP

(57) ABSTRACT

According to one embodiment, multiple first positions are set in a radial direction of a magnetic disk. The multiple first positions include multiple second positions and a third position different from the multiple second positions. A controller of a magnetic disk apparatus executes a first process in which an RRO correction value is measured at each of the multiple second positions and measurement of an RRO correction value at the third position is skipped. After the first process, the controller executes a second process of performing write or read access to multiple tracks. The second process includes acquiring a position error signal by a read head during the write or read access, and calculating an RRO correction value for the third position based on the position error signal.

16 Claims, 12 Drawing Sheets

(56) References Cited

U.S. PATENT DOCUMENTS

| | | |
|---|---|---|
| 2015/0302876 A1 | 10/2015 | Kashiwagi et al. |
| 2017/0263275 A1 | 9/2017 | Tagami |
| 2019/0198050 A1 | 6/2019 | Tagami et al. |
| 2019/0287560 A1 | 9/2019 | Tagami |
| 2020/0090691 A1 | 3/2020 | Tagami |
| 2022/0093124 A1 | 3/2022 | Kudo |
| 2024/0105225 A1 | 3/2024 | Suzuki et al. |

* cited by examiner

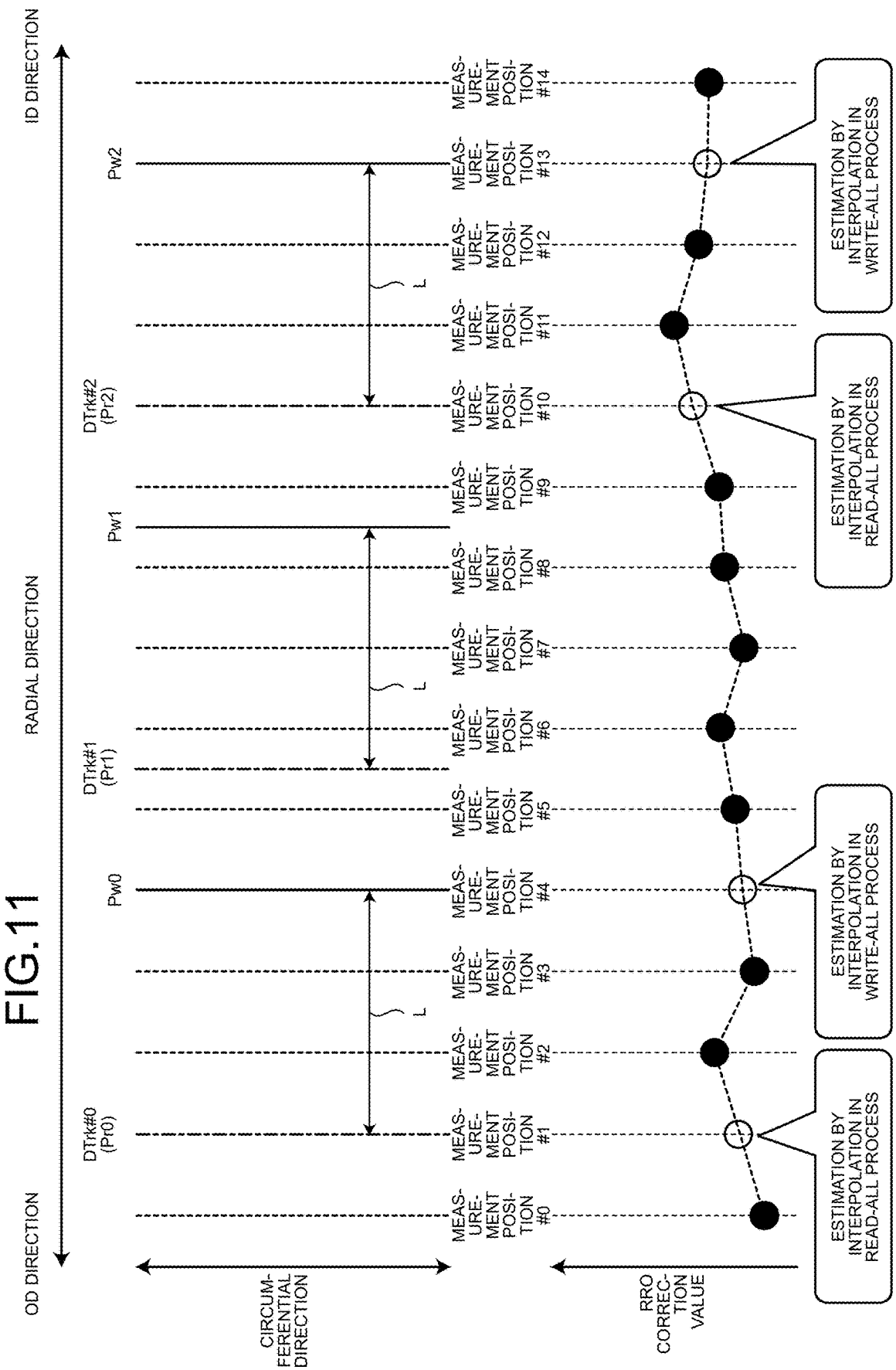

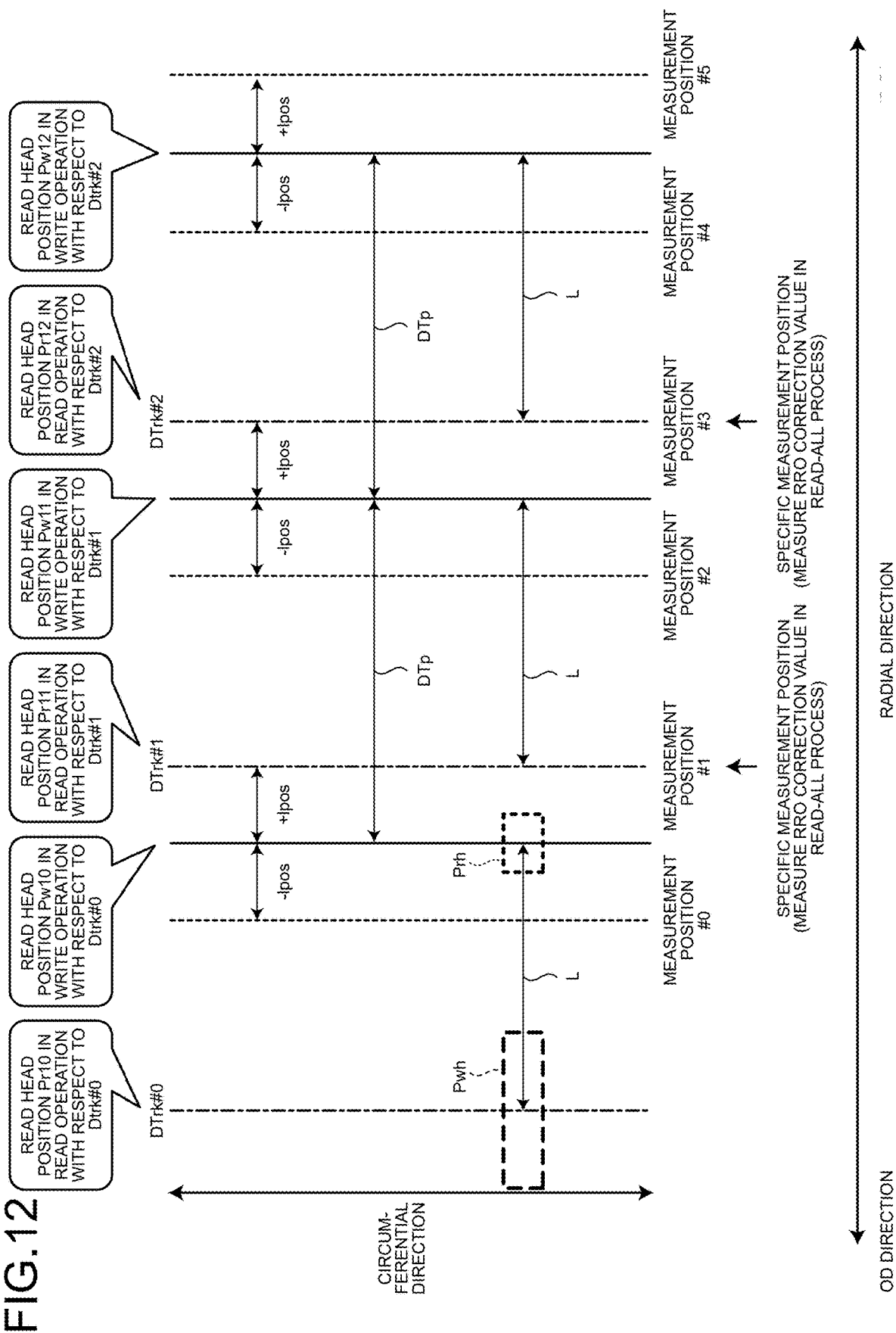

MAGNETIC DISK APPARATUS AND METHOD

CROSS-REFERENCE TO RELATED APPLICATIONS

This application is based upon and claims the benefit of priority from Japanese Patent Application No. 2024-081566, filed on May 20, 2024; the entire contents of which are incorporated herein by reference.

FIELD

Embodiments described herein relate generally to a magnetic disk apparatus and a method.

BACKGROUND

Conventionally, repeatable run-out (RRO) has been known as one of factors of a positioning error of a magnetic head in a magnetic disk apparatus. RRO refers to a positional deviation between a track trajectory defined by a burst pattern and an actual track trajectory. RRO fluctuates in synchronization with the rotation of the magnetic disk (and a spindle motor).

In a manufacturing process of the magnetic disk apparatus, a correction value (hereinafter, referred to as an RRO correction value) for correcting the positional deviation due to the RRO at a plurality of radial positions is measured. The measured RRO correction value is stored in a nonvolatile storage area as additional information of servo data. When the magnetic disk apparatus is operated, a position of the magnetic head is corrected by using the RRO correction value.

BRIEF DESCRIPTION OF THE DRAWINGS

FIG. 11 is a view for describing a method of estimating an RRO correction value at the specific measurement position in the write-all process and the read-all process of the magnetic disk apparatus according to the embodiment; and FIG. 12 is a view for describing another example of arrangement of multiple measurement positions according to the embodiment.

DETAILED DESCRIPTION

According to the present embodiment, a magnetic disk apparatus includes a magnetic disk, a magnetic head, and a controller. On the magnetic disk, multiple first positions are set in a radial direction and multiple tracks are provided. The multiple first positions are positions at which repeatable run-out (RRO) correction values are measured. The multiple first positions include multiple second positions and a third position different from the multiple second positions. The magnetic head includes a write head that is configured to perform write access to the magnetic disk, and a read head that is configured to perform read access to the magnetic disk. The controller is configured to execute a first process in which an RRO correction value is measured at each of the multiple second positions and measurement of an RRO correction value at the third position is skipped. The measuring of the RRO correction value at each of the multiple second positions includes, for each second position, moving the magnetic head to place the read head at a fourth position being one of the multiple second positions, acquiring a first position error signal by the read head while keeping the read head at the fourth position, and calculating an RRO correction value at the fourth position based on the first position error signal. The controller is configured to execute, after the first process, a second process of performing the write access or the read access to the multiple tracks. The second process includes acquiring a second position error signal by the read head during the write access or the read access, and calculating an RRO correction value at the third position based on the second position error signal.

Hereinafter, the magnetic disk apparatus and a method according to embodiments will be described in detail with reference to the attached drawings. Note that the present invention is not limited to the embodiments.

Embodiment

Figure 1:
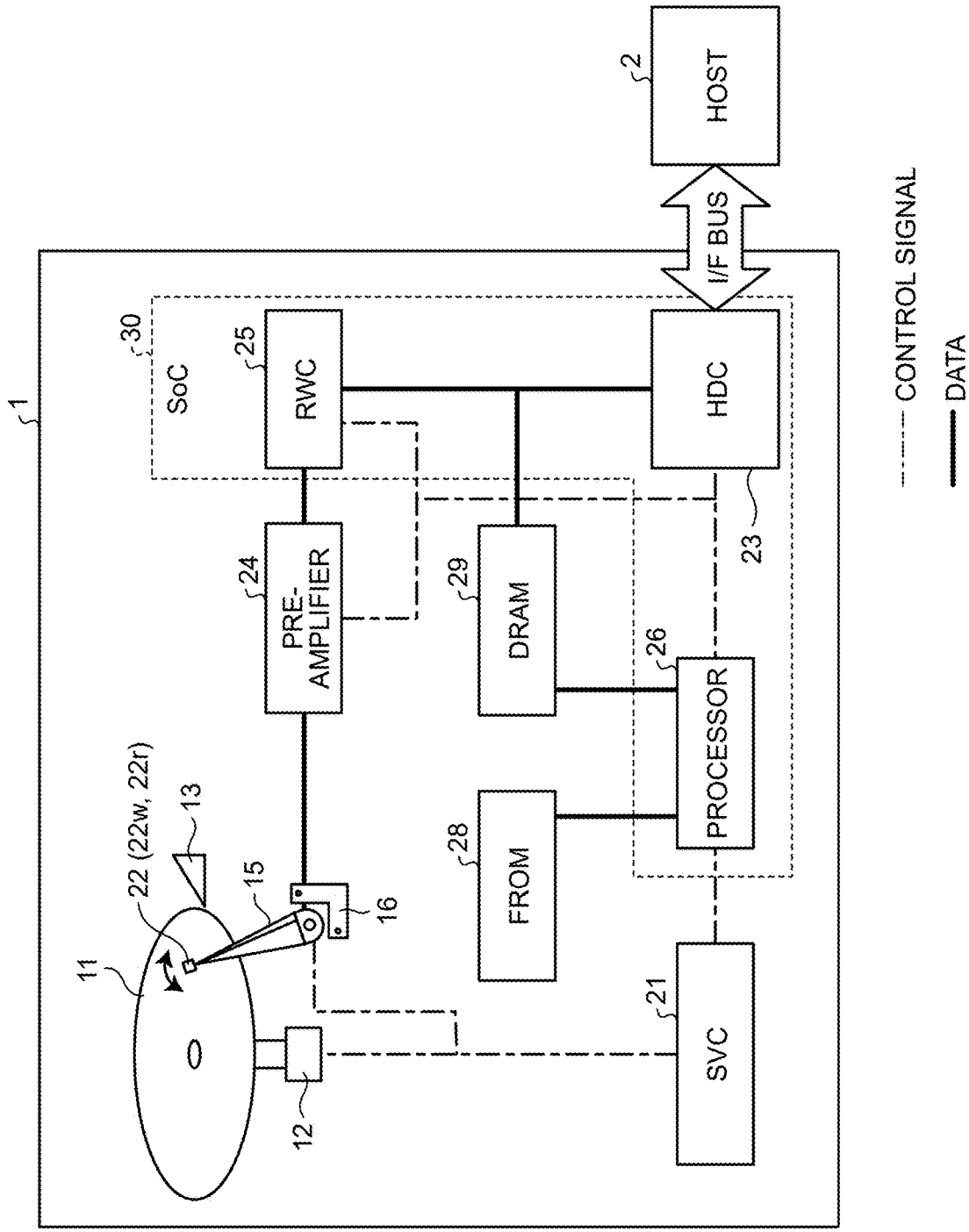
FIG. 1 is a diagram illustrating an example of a configuration of a magnetic disk apparatus of an embodiment.

FIG. 1 is a diagram illustrating an example of a configuration of a magnetic disk apparatus 1 of an embodiment.

The magnetic disk apparatus 1 is connected to a host 2. The magnetic disk apparatus 1 can receive an access command such as a write command or a read command from the host 2.

The magnetic disk apparatus 1 includes a magnetic disk 11 having a magnetic layer formed on its surface. The magnetic disk apparatus 1 accesses the magnetic disk 11 in response to the access command. The access includes write of data and read of data.

The write of data and the read of data are performed through a magnetic head 22. Specifically, the magnetic disk apparatus 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, a flash read only memory (FROM) 28, and a dynamic random access memory (DRAM) 29, in addition to the magnetic disk 11.

The magnetic disk 11 is rotated at a predetermined rotational speed by the SPM 12 that is coaxially attached.

The SVC 21 is an integrated circuit serves as a driver that drives the SPM 12 and the VCM 16. The processor 26 controls the rotation of the SPM 12 and the rotation of the VCM 16 via the SVC 21.

The magnetic head 22 includes a write head 22w and a read head 22r. The magnetic head 22 writes data to the magnetic disk 11 through the write head 22w. The magnetic head 22 reads data from the magnetic disk 11 through the read head 22r. The magnetic head 22 is attached to a distal end of the actuator arm 15. The magnetic head 22 is moved in the radial direction of the magnetic disk 11 by the VCM 16 that is driven by the SVC 21. Note that one or both of the write head 22w and the read head 22r included in the magnetic head 22 may be plurally provided in a single magnetic head 22.

When the rotation of the magnetic disk 11 is stopped, the magnetic head 22 is moved onto the ramp 13. The ramp 13 is configured to hold the magnetic head 22 at a position separated from the magnetic disk 11.

The preamplifier 24 is an integrated circuit that performs write and read of data through the magnetic head 22. During a read operation, the preamplifier 24 amplifies a signal read by the magnetic head 22 from the magnetic disk 11 and outputs the amplified signal to be supplied to the RWC 25. During a write operation, the preamplifier 24 amplifies a signal corresponding to write target data supplied from the RWC 25 and supplies the amplified signal to the magnetic head 22.

The HDC 23 controls transmission and reception of data to and from the host 2 via an I/F bus, and controls the DRAM 29.

The DRAM 29 is used as a buffer of data to be transmitted to and received from the host 2. In one example, the DRAM 29 is used for temporarily storing data to be written or data read from the magnetic disk 11.

In addition, the DRAM 29 is used as operation memory by the processor 26. The DRAM 29 is used as an area in which a firmware program is loaded and an area in which various types of management data are temporarily stored.

The RWC 25 modulates write target data supplied from the HDC 23 and supplies the modulated data to the preamplifier 24. In addition, the RWC 25 executes demodulation including error correction on a signal, which has been read from the magnetic disk 11 and supplied from the preamplifier 24, and then outputs the signal to the HDC 23 as digital data.

The processor 26 is, for example, a central processing unit (CPU). The flash read only memory (FROM) 28 and the DRAM 29 are connected to the processor 26.

The FROM 28 stores the firmware program, various types of setting information, and the like. Note that the firmware program may be stored in the magnetic disk 11.

In addition, the processor 26 performs overall control of the magnetic disk apparatus 1 in accordance with the firmware program stored in the FROM 28 or the magnetic disk 11. For example, the processor 26 loads the firmware program from the FROM 28 or the magnetic disk 11 into the DRAM 29, and executes control of the SVC 21, the preamplifier 24, the RWC 25, the HDC 23, and the like in accordance with the firmware program loaded into the DRAM 29.

Note that some or all of functions of the processor 26 may be implemented by a hardware circuit such as a field-programmable gate array (FPGA) and an application specific integrated circuit (ASIC).

The HDC 23, the RWC 25, and the processor 26 are configured as a system-on-a-chip (SoC) 30 that is one integrated circuit. In addition to these devices, the SoC 30 may include other elements (for example, the FROM 28, the DRAM 29, or the like). Note that the SoC 30 is an example of a controller.

Figure 2:
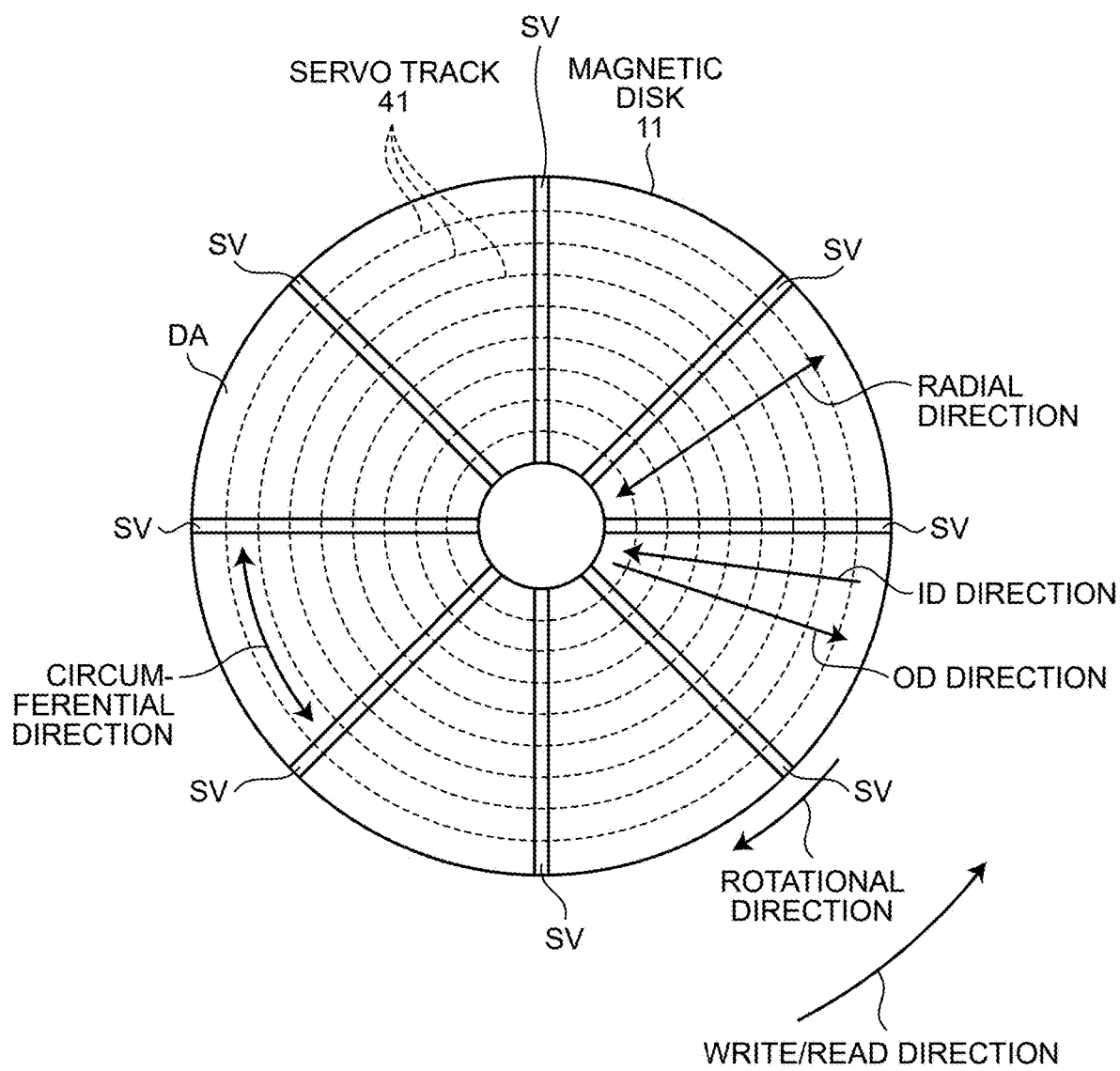
FIG. 2 is a view illustrating an example of a configuration of a magnetic disk in the embodiment.

FIG. 2 is a view illustrating an example of a configuration of the magnetic disk 11 in the embodiment. Note that this drawing illustrates an example of a rotational direction of the magnetic disk 11. The magnetic head 22 moves relative to the magnetic disk 11 by the rotation of the magnetic disk 11. Therefore, a write/read direction, namely, a direction in which data is written or read by the magnetic head 22 in the circumferential direction is opposite to the rotational direction of the magnetic disk 11.

In the radial direction, a direction from a rim to a center of the magnetic disk 11 is referred to as an inner diameter (ID) direction, and a direction from the center to the rim of the magnetic disk 11 is referred to as an outer diameter (OD) direction.

Servo data used for positioning of the magnetic head 22 is written to the magnetic disk 11 by, for example, a servo writer or self-servo write (SSW) in a manufacturing process. According to FIG. 2, servo areas SV that are arranged radially in the radial direction and at predetermined intervals in the circumferential direction are provided, as an example of arrangement of servo areas in which the servo data is written. A data area DA in which data is written is provided between two servo areas SV adjacent to each other in the circumferential direction.

A plurality of concentric servo tracks 41 is provided in the radial direction of the magnetic disk 11. The servo data written in the servo area SV is used for positioning of the magnetic head 22.

More specifically, the concentric data tracks are provided above an area of the magnetic disk 11 where the servo tracks 41 are provided. The servo tracks 41 may be used as the data tracks, or the data tracks different from the servo tracks 41 may be provided. A plurality of data sectors is arrayed in the circumferential direction in an area divided by the data area DA on each data track. Data may be written to each data sector by the magnetic head 22. Note that data that may be written to each data sector includes user data received from the host 2, metadata (for example, error correction code) accompanying the user data, system data, and the like. The magnetic disk apparatus 1 holds, in advance, the setting of the positional relationship between the servo tracks 41 and the data tracks. The magnetic disk apparatus 1 executes positioning control for positioning the magnetic head 22 in a target data track based on the servo data recorded in the servo area SV. The positioning control includes a seek operation that is an operation of moving the magnetic head 22 in the radial direction toward the target data track, a tracking operation of keeping the magnetic head 22 on the target data track, and the like.

Note that the data tracks are an example of the multiple tracks.

The servo data includes sector/cylinder information, a burst pattern, an RRO correction value, and the like. The sector/cylinder information indicates a servo address (servo sector address) in the circumferential direction of the magnetic disk 11 and a position (track number) of a track set in the radial direction. The track number obtained from the sector/cylinder information is an integer value, and the burst pattern represents an offset amount after the decimal point with the track number as a reference.

An ideal shape of the track is a perfect circle. However, the servo track 41 is warped due to vibration or the like occurring when the servo data is written. Thus, there is a case where a position in the radial direction (radial position) that is specified based on the burst pattern (more precisely, a combination of the sector/cylinder information and the burst pattern) deviates from an ideal radial position. This positional deviation causes deterioration in positioning accuracy. This positional deviation occurs repeatedly in the same manner with one rotation of the magnetic disk (and the spindle motor) as a cycle, and thus, is called RRO. In the manufacturing process, the RRO correction value is learned at a plurality of radial positions. In use of the magnetic disk apparatus 1, when performing positioning of the magnetic head 22 on the target track, control to cancel the positional deviation caused by RRO is executed based on the RRO correction values.

Note that a place where each of the RRO correction values obtained at the radial positions is stored is not necessarily the servo area SV as long as the place is a nonvolatile storage area. Each of the RRO correction values may be stored in the data area DA or may be stored in a nonvolatile memory such as the FROM 28. In the magnetic disk apparatus 1, the RRO correction value is read from the nonvolatile storage area, and the position of the magnetic head 22 is corrected by using the read RRO correction value.

Hereinafter, a process of measuring the RRO correction values at the plurality of radial positions is referred to as an RRO learning process. In addition, each of the radial positions where the RRO correction value is measured is described as a measurement position or an RRO measurement position. The correction of the positional deviation by RRO is referred to as RRO correction.

Measurement positions may be set independently of the arrangement of a group of the data tracks. In a case where a target data track exists at a radial position between two measurement positions adjacent to each other, the SoC 30 executes the RRO correction as follows. The SoC 30 estimates an RRO correction value at the radial position of the target data track by interpolation of RRO correction values including RRO correction values of the two measurement positions. The SoC 30 then executes the RRO correction by using the RRO correction value obtained by the estimation.

The interpolation may be linear interpolation using the respective RRO correction values of the two measurement positions adjacent to the target data track. Alternatively, the interpolation may be second or higher order polynomial interpolation using RRO correction values of three or more measurement positions including the two measurement positions.

Measurement positions are set at as fine intervals as possible in the radial direction in order to enhance the positioning accuracy as much as possible.

Measurement of an RRO correction value at one measurement position includes measurement of a position error signal at the one measurement position and calculation of the RRO correction value based on the measured position error signal. Since a large number of measurement positions are set and RRO correction values at all the measurement positions are measured, the RRO learning process requires a large amount of time.

In the embodiment, the SoC 30 is configured to skip the measurement of RRO correction values at some measurement positions in the RRO learning process in order to reduce the time required to measure the RRO correction values at all the measurement positions.

The manufacturing process includes a process of writing data to all the data tracks of the magnetic disk 11 or reading data from all the data tracks of the magnetic disk 11 after the RRO learning process. An operation of writing data to all the data tracks of the magnetic disk 11 is referred to as a write-all process. An operation of reading data from all the data tracks of the magnetic disk 11 is referred to as a read-all process. A pair of the write-all process and the read-all process is executed to detect a defective data sector and verify whether each data sector can be normally accessed. The pair of the write-all process and the read-all process may be executed multiple times. The manufacturing process may include a defective data sector detection process and a defect servo sector detection process other than the write-all process and the read-all process.

The multiple measurement positions may include a radial position that is accessed in the write-all process or the read-all process. Such a radial position accessed in the write-all process or the read-all process among the multiple measurement positions is referred to as a specific measurement position. In a case where the multiple measurement positions includes a radial position accessed in the defective data sector detection process or the defective servo sector detection process, the radial position may be used as the specific measurement position.

In the RRO learning process, the SoC 30 skips measurement of an RRO correction value at the specific measurement position. When accessing the specific measurement position or the vicinity of the specific measurement position in the write-all process or the read-all process after the RRO learning process, the SoC 30 measures an RRO correction value at the specific measurement position. Thus, in the RRO learning process, the seek operation of the magnetic head 22 and the tracking operation for one cycle of the data track are omitted for each specific measurement position, and the time required for measuring the RRO correction values at all the measurement positions is shortened. Thus, the efficiency of the RRO correction value measurement is improved.

Prior to description as to details of the multiple measurement positions and the specific measurement position, a radial position where the read head 22r passes over and a radial position where the write head 22w passes over will be described.

Figure 3:
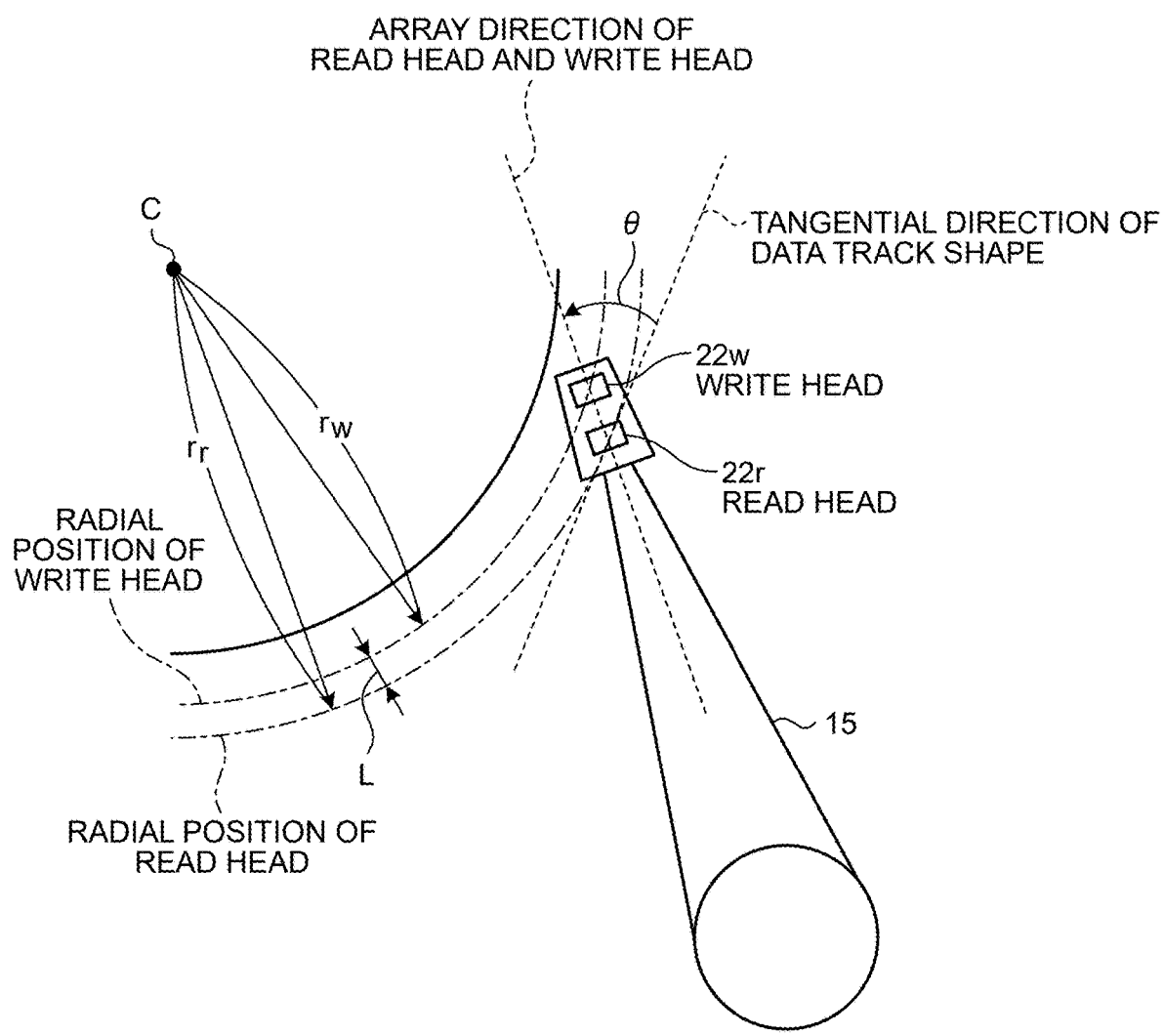
FIG. 3 is a view for describing an example of the positional relationship between a read head and a write head in the embodiment.

FIG. 3 is a view for describing an example of the positional relationship between the read head 22r and the write head 22w in the embodiment. According to the example illustrated in this drawing, the read head 22r and the write head 22w are arrayed in an extending direction of the actuator arm 15. The read head 22r is arranged on a side closer to a rotation axis of the actuator arm 15 than the write head 22w.

In the example illustrated in FIG. 3, in a case where the read head 22r is positioned on a given data track, an angle θ, formed by an array direction of the read head 22r and the write head 22w and a tangential direction of the track as a positioning target is non-zero. As a result, a radial position of the read head 22r and a radial position of the write head 22w are different. When a distance from a rotation center C of the magnetic disk 11 to the radial position of the read head 22r is expressed as $r_r$, and a distance from the rotation center C of the magnetic disk 11 to the radial position of the write head 22w is expressed as $r_w$, the radial position of the read head 22r and the radial position of the write head 22w are separated by L ($=|r_r-r_w|$) in the radial direction of the magnetic disk 11. Hereinafter, L is referred to as a distance between head positions.

Figure 4:
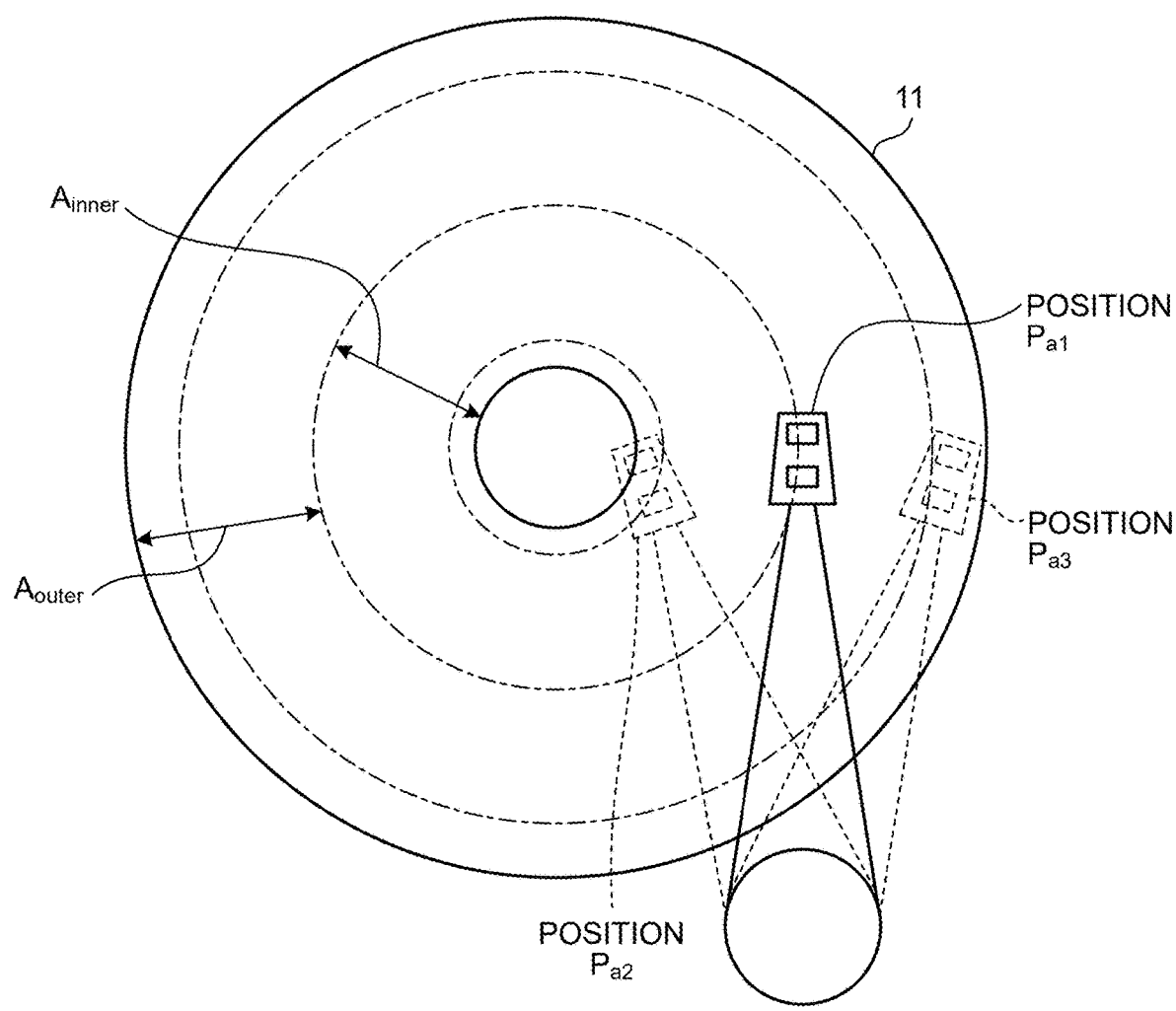
FIG. 4 is a view for describing that a distance between head positions varies with a position of a magnetic head in the embodiment.

The distance between head positions may vary with a position of the magnetic head 22. FIG. 4 is a view for describing that the distance between head positions varies with the position of the magnetic head 22 in the embodiment.

At a position $P_{a1}$, a direction in which the write head 22w and the read head 22r are arranged is orthogonal to the radial direction. In such a case, the radial position of the read head 22r and the radial position of the write head 22w become equal, so that the distance between head positions L is zero.

In a case where the magnetic head 22 is in an area $A_{inner}$ on the inner peripheral side of the position $P_{a1}$, for example, in a case where the magnetic head 22 is placed at a position $P_{a2}$, the write head 22w is located on the inner peripheral side of the read head 22r as in the example illustrated in FIG. 3. In short, the distance between head positions L is non-zero. A value of the distance between head positions L increases as the position of the magnetic head 22 moves away from the position $P_{a1}$ to the inner peripheral side.

In a case where the magnetic head 22 is in an area $A_{outer}$ on the outer peripheral side of the position $P_{a1}$, for example, in a case where the magnetic head 22 is placed at a position $P_{a3}$, the write head 22w is located closer to the outer peripheral side of the magnetic disk 11 than the read head 22r. In short, the distance between head positions L is non-zero. A value of the distance between head positions L increases as the position of the magnetic head 22 moves away from the position $P_{a1}$ to the outer peripheral side.

Note that the examples illustrated in FIGS. 3 and 4 are merely examples. For example, the arrangement direction of the write head 22w and the read head 22r does not necessarily coincide with the extending direction of the actuator arm 15.

Figure 5:
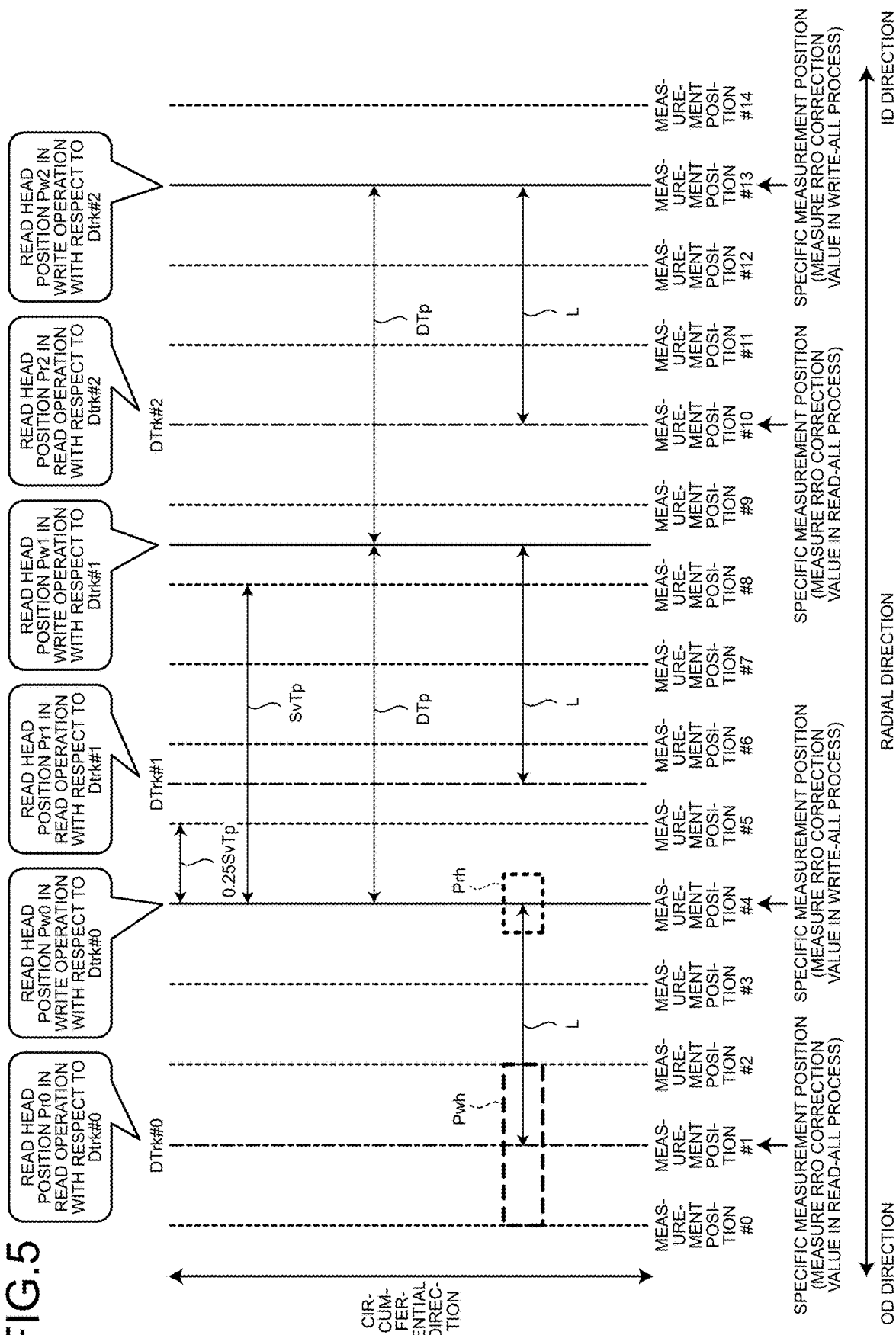
FIG. 5 is a view for describing multiple measurement positions and a specific measurement position in the embodiment.

FIG. 5 is a view for describing the multiple measurement positions and the specific measurement position in the embodiment. This drawing illustrates a partial area included in the area $A_{outer}$ on a recording surface of the magnetic disk 11. Thus, the write head 22w is located closer to the outer peripheral side of the magnetic disk 11 than the read head 22r.

Each of the measurement positions is given an identification number that increases by one toward the inner peripheral side. A measurement position with an identification number X (where X is numerical information) is referred to as a measurement position #X. FIG. 5 illustrates fifteen measurement positions #0 to #14 as an example of the multiple measurement positions.

In addition, each of the data tracks is given an identification number (hereinafter, referred to as a data track number) that increases by one toward the inner peripheral side. A data track having a data track number Y (where Y is numerical information) is referred to as a data track DTrk #Y. FIG. 5 illustrates three data tracks DTrk #0 to DTrk #2 as an example of multiple data tracks DTrk.

As described above, the measurement positions are set regardless of the arrangement of the respective data tracks DTrk. Here, as one example, the three data tracks DTrk #0 to DTrk #2 are set at an interval of a track pitch DTp. The fifteen measurement positions #0 to #14 are set at an interval of ¼ of a track pitch SvTP of the servo track 41 (namely, an interval of 0.25×SvTP). A value of 0.25×SvTP is different from DTp.

In the example illustrated in FIG. 5, a radial position of the data track DTrk #0 coincides with the measurement position #1. A radial position of the data track DTrk #1 is located between the measurement position #5 and the measurement position #6. A radial position of the data track DTrk #2 coincides with the measurement position #10.

Hereinafter, the radial position of the read head 22r is referred to as a read head position.

In a read operation with respect to the data track DTrk #0, a tracking operation is executed such that the read head 22r moves along DTrk #0. In other words, the tracking operation is executed so as to keep the read head 22r on the read head position Pr0. The data track DTrk #0 (and a read head position Pr0) coincides with the measurement position #1. Thus, when the read operation with respect to the data track DTrk #0 is executed in the read-all process, an RRO correction value at the measurement position #1 can be measured. The measurement position #1 is set as a specific measurement position where the RRO correction value is measured in the read-all process.

In a write operation with respect to the data track DTrk #0, a tracking operation is executed such that the write head 22w moves along DTrk #0. At this time, the read head 22r is kept at a radial position (a read head position Pw0 in FIG. 5) separated from DTrk #0 by the distance between head positions L in the ID direction. When, for example, the write head 22w is placed at a position Pwh on the data track DTrk #0, the read head 22r is located at a position Prh separated from the position Pwh on the data track DTrk #0 by the distance between head positions L in the ID direction. In the example illustrated in FIG. 5, a radial position (read head position Pw0) separated from the data track DTrk #0 by the distance between head positions L in the ID direction coincides with the measurement position #4. Thus, when the write operation with respect to the data track DTrk #0 is executed in the write-all process, an RRO correction value at the measurement position #4 can be measured. Thus, the measurement position #4 is set as a specific measurement position where the RRO correction value is measured in the write-all process.

In a read operation with respect to the data track DTrk #1, a tracking operation is executed such that the read head 22r moves along DTrk #1 (a read head position Pr1 in FIG. 5). The read head position Pr1 does not coincide with any measurement position.

In a write operation with respect to the data track DTrk #1, a tracking operation is executed such that the write head 22w moves along DTrk #1. At this time, the read head 22r moves at a radial position (a read head position Pw1 in FIG. 5) separated from DTrk #1 by the distance between head positions L in the ID direction. The read head position Pw1 does not coincide with any measurement position.

In a read operation with respect to the data track DTrk #2, a tracking operation is executed such that the read head 22r moves along DTrk #2. In other words, the tracking operation is executed so as to keep the read head 22r on a read head position Pr2. The data track DTrk #2 (and the read head position Pr2) coincides with the measurement position #10. Thus, when the read operation with respect to the data track DTrk #2 is executed in the read-all process, an RRO correction value at the measurement position #10 can be measured. The measurement position #10 is set as a specific measurement position where the RRO correction value is measured in the read-all process.

In a write operation with respect to the data track DTrk #2, a tracking operation is executed such that the write head 22w moves along DTrk #2. At this time, the read head 22r moves at a radial position (a read head position Pw2 in FIG. 5) separated from DTrk #2 by the distance between head positions L in the ID direction. In the example illustrated in FIG. 5, the read head position Pw2 coincides with the measurement position #13. Thus, when the write operation with respect to the data track DTrk #2 is executed in the write-all process, an RRO correction value at the measurement position #13 can be measured. The measurement position #13 is set as a specific measurement position where the RRO correction value is measured in the write-all process.

In the RRO learning process, the SoC 30 skips measurement of RRO correction values at the measurement positions #1, #4, #10, and #13, which are the specific measurement positions, out of the measurement positions #0 to #14. The SoC 30 executes measurement of the RRO correction values at the measurement positions #4 and #13 in the write-all process. The SoC 30 executes measurement of the RRO correction values at the measurement positions #1 and #10 in the read-all process.

Hereinafter, a group of read head positions during the write operation with respect to each data track DTrk in the write-all process is referred to as a read head position group in the write-all process. In addition, a group of read head positions during the read operation with respect to each data track DTrk in the read-all process is referred to as a read head position group in the read-all process. For example, the read head positions Pw0, Pw1, and Pw2 illustrated in FIG. 5 are included in the read head position group in the write-all process. The read head positions Pr0, Pr1, and Pr2 are included in the read head position group in the read-all process.

Note that multiple measurement positions (for example, the measurement positions #0 to #14) is an example of the multiple first positions. The specific measurement position out of the measurement positions is an example of the third position. Measurement positions (for example, the measurement positions #0, #2, #3, #5 to #9, #11, #12, and #14) different from the specific measurement position out of the multiple measurement positions are an example of the multiple second positions.

The read head position group in the write-all process and the read head position group in the read-all process are recorded in a read head position table that is one of the setting information. The read head position table is stored in a predetermined storage area (for example, the FROM 28) in the magnetic disk apparatus 1. The read head position table may be generated outside the magnetic disk apparatus 1 and stored in a predetermined storage area. Alternatively, the SoC 30 may generate the read head position table by itself by some method and store the generated read head position table in a predetermined storage area.

Figure 6:
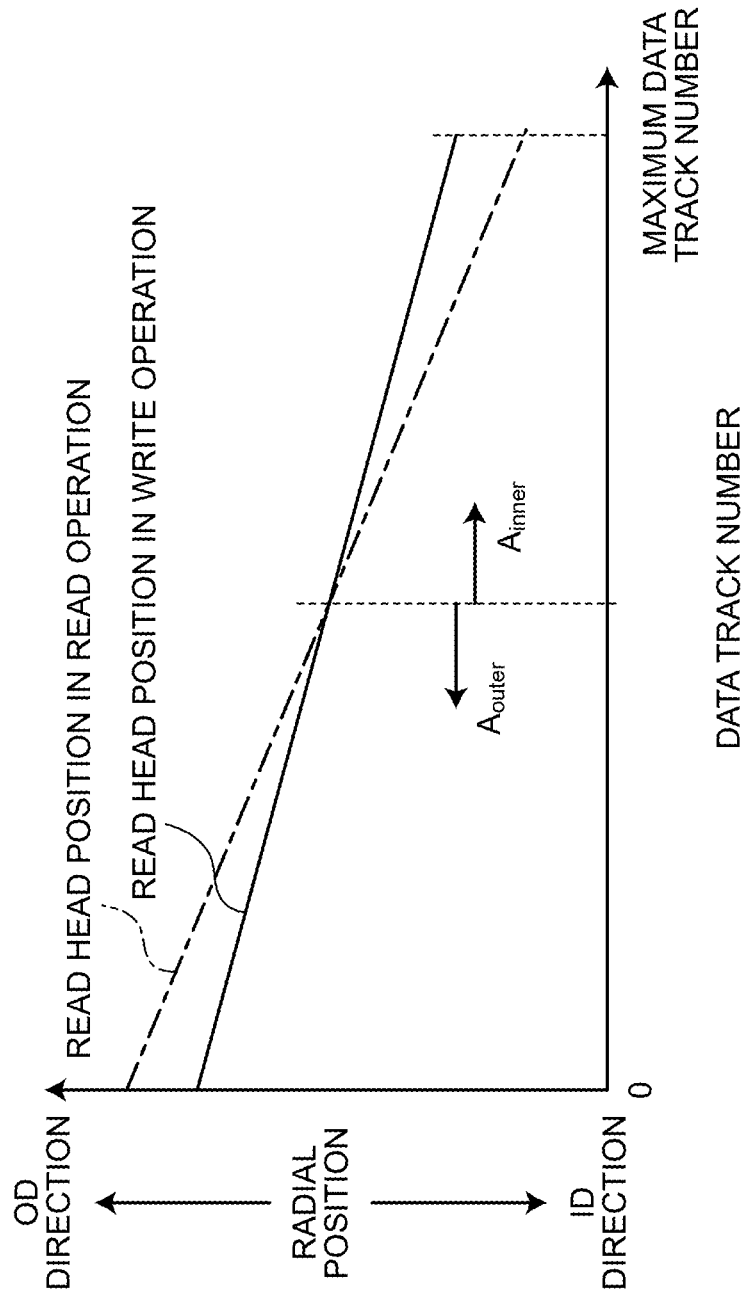
FIG. 6 is a view illustrating an example of information recorded in a read head position table in the embodiment.

FIG. 6 is a view illustrating an example of information recorded in the read head position table in the embodiment. As illustrated in this drawing, the correspondence relationship between the data track number and the position of the read head 22r during the read operation and the position of the read head 22r during the write operation is recorded in the read head position table. From this drawing, it can be read that the position of the read head 22r during the write operation is located on the inner peripheral side of the position of the read head 22r during the read operation in an area on the outer peripheral side (corresponding to the area $A_{outer}$), and the position of the read head 22r during the write operation is located on the outer peripheral side of the position of the read head 22r during the read operation in an area on the inner peripheral side (corresponding to the area $A_{inner}$).

In the RRO learning process, the SoC 30 determines whether a measurement position coincides with any read head position of the read head position group in the write-all process or the read head position group in the read-all process based on the read head position table. When the measurement position coincides with any read head position, the SoC 30 determines that the measurement position is the specific measurement position. When the measurement position does not coincide with any read head position, the SoC 30 determines that the measurement position is not the specific measurement position.

Note that, even if the measurement position does not coincide with any read head position of the read head position group in the write-all process or the read head position group in the read-all process, the SoC 30 may determine that the measurement position is the specific measurement position in a case where a predetermined condition is satisfied. For example, in a case where a distance between a measurement position and a read head position closest to the measurement position in the read head position group in the write-all process or the read head position group in the read-all process is smaller than a threshold Dth, the SoC 30 determines that the measurement position is the specific measurement position. In a case where a distance between a measurement position and a read head position closest to the measurement position in the read head position group in the write-all process or the read head position group in the read-all process is larger than the threshold Dth, the SoC 30 determines that the measurement position is not the specific measurement position. In a case where a distance between a measurement position and a read head position closest to the measurement position in the read head position group in the write-all process or the read head position group in the read-all process is equal to the threshold Dth, the SoC 30 may determine that the measurement position is the specific measurement position or may determine that the measurement position is not the specific measurement position. The threshold Dth is, for example, a value equal to or smaller than the interval between the measurement positions.

As one example, a case where the threshold Dth coincides with the interval between the measurement positions is considered. Since distances of both the measurement positions #5 and #6 illustrated in FIG. 5 from the read head position Pr1 are equal to or smaller than the threshold Dth, the SoC 30 recognizes the measurement positions #5 and #6 as the specific measurement positions. In the RRO learning process, the SoC 30 skips measurement of RRO correction values at the measurement positions #5 and #6. In the read-all process, the SoC 30 first measures an RRO correction value at the read head position Pr1 at the time of executing the read operation with respect to the data track DTrk #1. Thereafter, the SoC 30 estimates the RRO correction value at the measurement position #5 by interpolation using the RRO correction value at the measurement position #4 and the RRO correction value at the read head position Pr1. In addition, the SoC 30 estimates the RRO correction value at the measurement position #6 by interpolation using the RRO correction value at the read head position Pr1 and an RRO correction value at the measurement position #7. Note that the interpolation in this example is linear interpolation, for example. The SoC 30 may execute second or higher order polynomial interpolation.

In the following description, it is assumed that the SoC 30 is configured to recognize, as the specific measurement position, a measurement position at which a distance of the measurement position from a read head position of the read head position group in the write-all process or a read head position of the read head position group in the read-all process is equal to or smaller than the threshold Dth.

Note that the threshold Dth may be zero. In a case where the threshold Dth is zero, the SoC 30 recognizes, as the specific measurement position, only a measurement position that coincides with a read head position of the read head position group in the write-all process or a read head position of the read head position group in the read-all process among the measurement positions.

Next, operations of the magnetic disk apparatus 1 according to the embodiment will be described.

Figure 7:
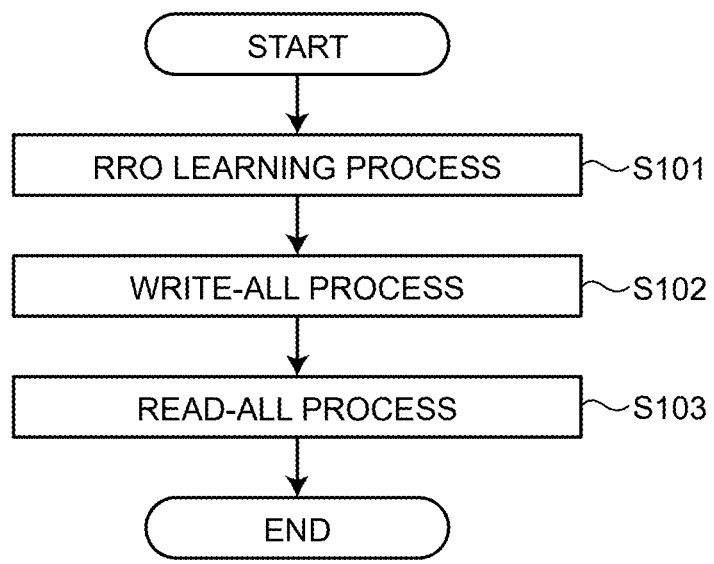
FIG. 7 is a flowchart illustrating exemplary operations in a manufacturing process executed by the magnetic disk apparatus according to the embodiment.

FIG. 7 is a flowchart illustrating exemplary operations in the manufacturing process executed by the magnetic disk apparatus 1 according to the embodiment. The flowchart of FIG. 7 is an excerpt of some processes, and adjustment for performing accurate servo control, adjustment for recording user data, adjustment for determining a user data format, a defective servo sector finding process, a medium defect finding process, and the like, which are not illustrated in FIG. 7, may be performed.

The SoC 30 executes the RRO learning process (S101). The RRO learning process is executed after the magnetic disk apparatus 1 is assembled and servo data excluding RRO correction values is written in the servo areas SV of the magnetic disk 11. For example, the processor 26 controls a series of operations of the RRO learning process in accordance with the dedicated firmware program.

After the processing of S101, the SoC 30 executes the write-all process (S102). As described above, data is written to all the data tracks DTrk in the write-all process. Subsequently, the SoC 30 executes the read-all process (S103). In the read-all process, data is read from all the data tracks DTrk.

Then, the operations in the manufacturing process end.

Note that a pair of the processing of S102 and the processing of S103 may be executed multiple times after the processing of S101 as described above. The RRO learning process in S101 is an example of the first process. The write-all process in S102 and the read-all process in S103 are examples of the second process.

Figure 8:
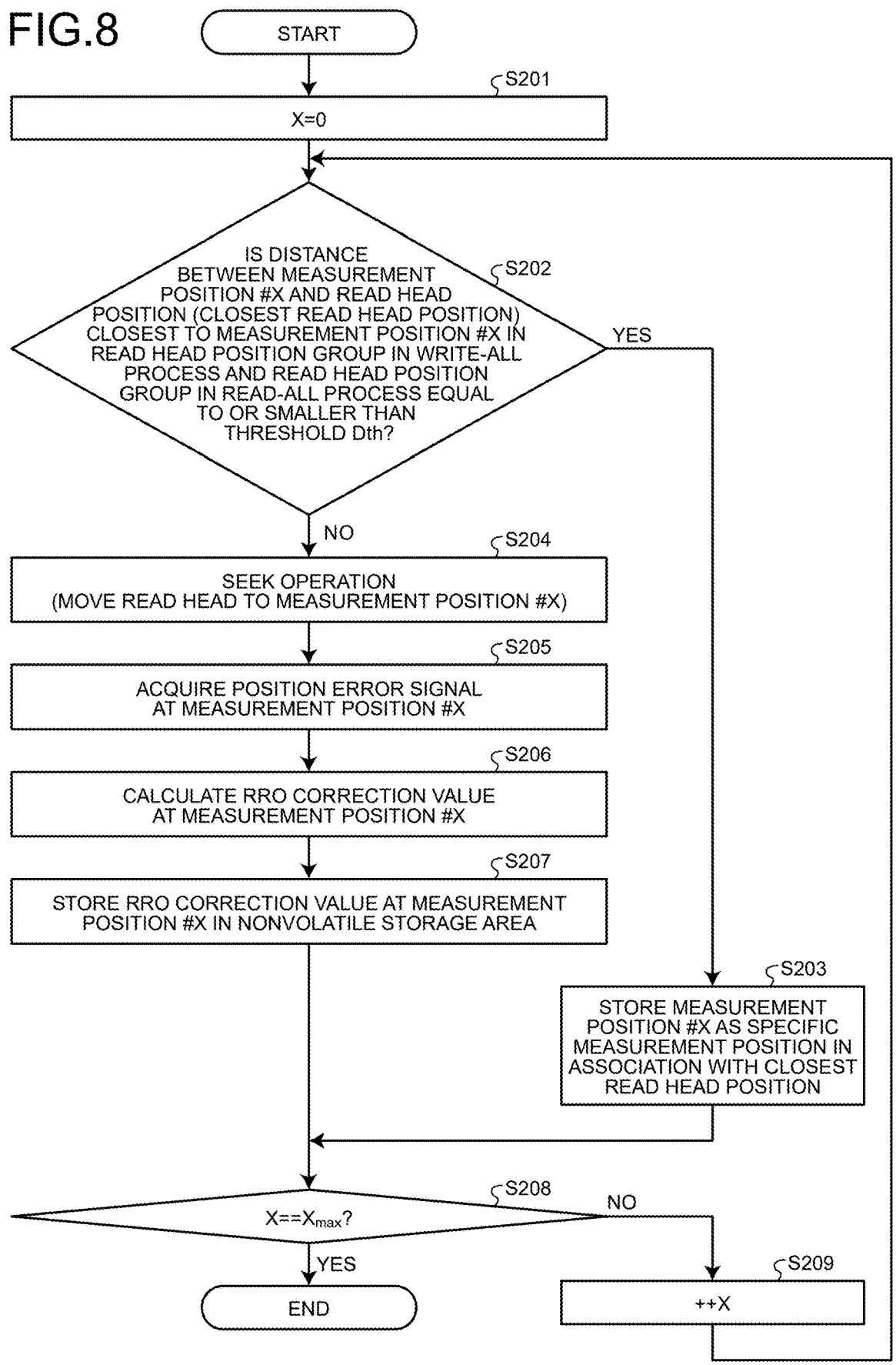
FIG. 8 is a flowchart illustrating exemplary operations in an RRO learning process of the magnetic disk apparatus according to the embodiment.

FIG. 8 is a flowchart illustrating exemplary operations in the RRO learning process of the magnetic disk apparatus 1 according to the embodiment.

First, the SoC 30 initializes a variable X to zero (S201). X is a variable that may take a numerical value within a range of the identification numbers given to the measurement positions, and is an index used in the subsequent loop processing. A maximum value of the identification numbers given to the measurement positions is denoted as $X_{max}$.

The SoC 30 determines whether a distance between a measurement position #X and a read head position closest to the measurement position #X (referred to as a closest read head position) in the read head position group in the write-all process and the read head position group in the read-all process is equal to or smaller than the threshold Dth (S202). In one example, the SoC 30 can determine the closest read head position on the basis of the read head position table.

In a case where the distance between the measurement position #X and the closest read head position is equal to or smaller than the threshold Dth (S202: Yes), the SoC 30 stores the measurement position #X as the specific measurement position (S203). At this time, the SoC 30 stores the closest read head position in correlation with the measurement position #X. A storage area in which the measurement position #X as the specific measurement position is stored is not limited to a specific storage area. For example, the SoC 30 stores a pair of the measurement position #X as the specific measurement position and the closest read head position in the DRAM 29.

In a case where the distance between the measurement position #X and the closest read head position is not equal to or smaller than the threshold Dth (S202: No), the SoC 30 executes a seek operation to move the read head 22r to the measurement position #X (S204).

The SoC 30 acquires a position error signal at the measurement position #X while executing a tracking operation of keeping the read head 22r at the measurement position #X (S205). The position error signal is obtained by demodulating the servo data when the read head 22r passes over the servo area SV. The SoC 30 acquires the position error signals for one rotation of the magnetic disk 11. The position error signal acquired by this processing is an example of the first position error signal.

The SoC 30 calculates an RRO correction value at the measurement position #X based on the position error signals for one rotation of the magnetic disk 11 at the measurement position #X (S206). The SoC 30 calculates RRO correction value in each of the servo areas SV for one rotation of the magnetic disk 11.

The SoC 30 stores the RRO correction value in each of the servo areas SV for one rotation of the magnetic disk 11 at the measurement position #X in a nonvolatile storage area (S207). As described above, the nonvolatile storage area as a storage destination may be the servo area SV of the magnetic disk 11, the data area DA, or the FROM 28.

After the processing of S203 or the processing of S207, the SoC 30 determines whether X is equal to $X_{max}$ (S208).

In a case where X is not equal to $X_{max}$ (S208: No), the SoC 30 increments a value of X by one (5209), and the control transitions to S202. In a case where X is equal to $X_{max}$ (S208: Yes), the RRO learning process is completed.

Figure 9:
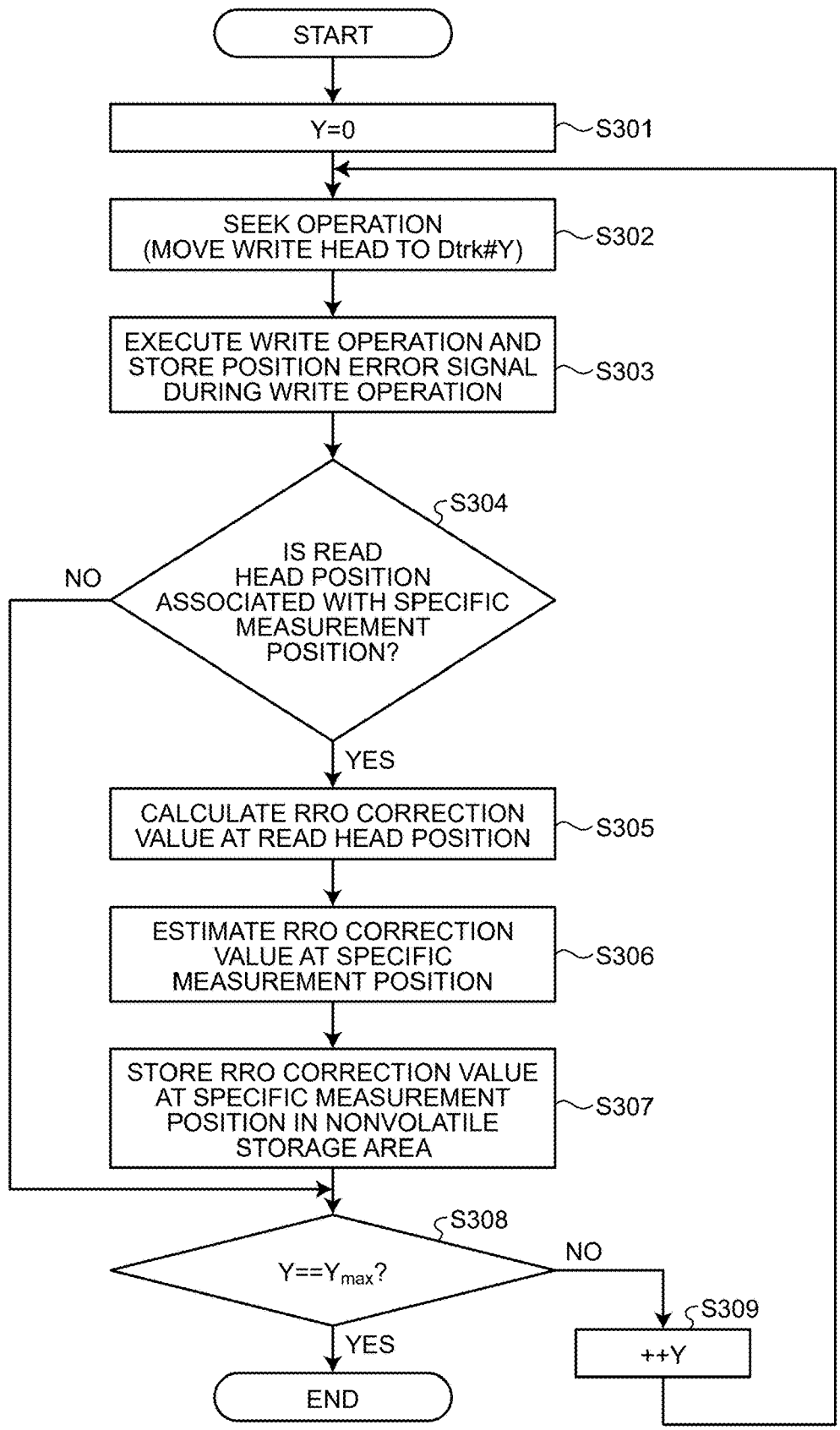
FIG. 9 is a flowchart illustrating exemplary operations in a write-all process of the magnetic disk apparatus according to the embodiment.

FIG. 9 is a flowchart illustrating exemplary operations in the write-all process of the magnetic disk apparatus 1 according to the embodiment.

First, the SoC 30 initializes a variable Y to zero (S301). Y is a variable that may take a numerical value within a range of the data track numbers, and is also an index used in the subsequent loop processing. A maximum value of the data track numbers is denoted as $Y_{max}$.

The SoC 30 executes a seek operation of moving the write head 22w to the data track DTrk #Y (S302).

The SoC 30 then executes a write operation of writing data to the data track DTrk #Y and stores a position error signal during the write operation (S303).

In the processing of S303, the SoC 30 acquires the position error signal by demodulating the servo data when the read head 22r passes over the servo area SV. The SoC 30 continues the write operation while executing a tracking operation of keeping the write head 22w on the data track DTrk #Y based on the position error signal. During the write operation, the SoC 30 stores the position error signals for one rotation of the magnetic disk 11 acquired at a read head position. A storage area where the position error signal is stored is not limited to a specific storage area. For example, the SoC 30 stores the position error signal in the DRAM 29. The position error signal acquired by this processing is an example of the second position error signal.

Subsequently, the SoC 30 determines whether the read head position during the write operation with respect to the data track DTrk #Y is correlated with a specific measurement position (S304).

In a case where the read head position during the write operation with respect to the data track DTrk #Y is correlated with the specific measurement position (S304: Yes), the SoC 30 calculates an RRO correction value at the read head position (S305). The SoC 30 calculates RRO correction value in each of the servo areas SV for one rotation of the magnetic disk 11.

Subsequently, the SoC 30 estimates an RRO correction value at the specific measurement position correlated with the read head position by interpolation using the RRO correction value at the read head position during the write operation with respect to the data track DTrk #Y (S306). Also in the processing of S306, the SoC 30 estimates the RRO correction value in each of the servo areas SV for one rotation of the magnetic disk 11.

The SoC 30 stores the RRO correction value in each of the servo areas SV for one rotation of the magnetic disk 11 at the specific measurement position in a nonvolatile storage area (S307). As described above, the nonvolatile storage area as a storage destination may be the servo area SV of the magnetic disk 11, the data area DA, or the FROM 28.

In a case where the read head position during the write operation with respect to the data track DTrk #Y is not correlated with any specific measurement position (S304: No) or after the processing of S307, the SoC 30 determines whether Y is equal to $Y_{max}$ (S308).

In a case where Y is not equal to $Y_{max}$ (S308: No), the SoC 30 increments the value of Y by one (S309), and the control transitions to S302. In a case where Y is equal to $Y_{max}$ (S308: Yes), the write-all process is completed.

Figure 10:
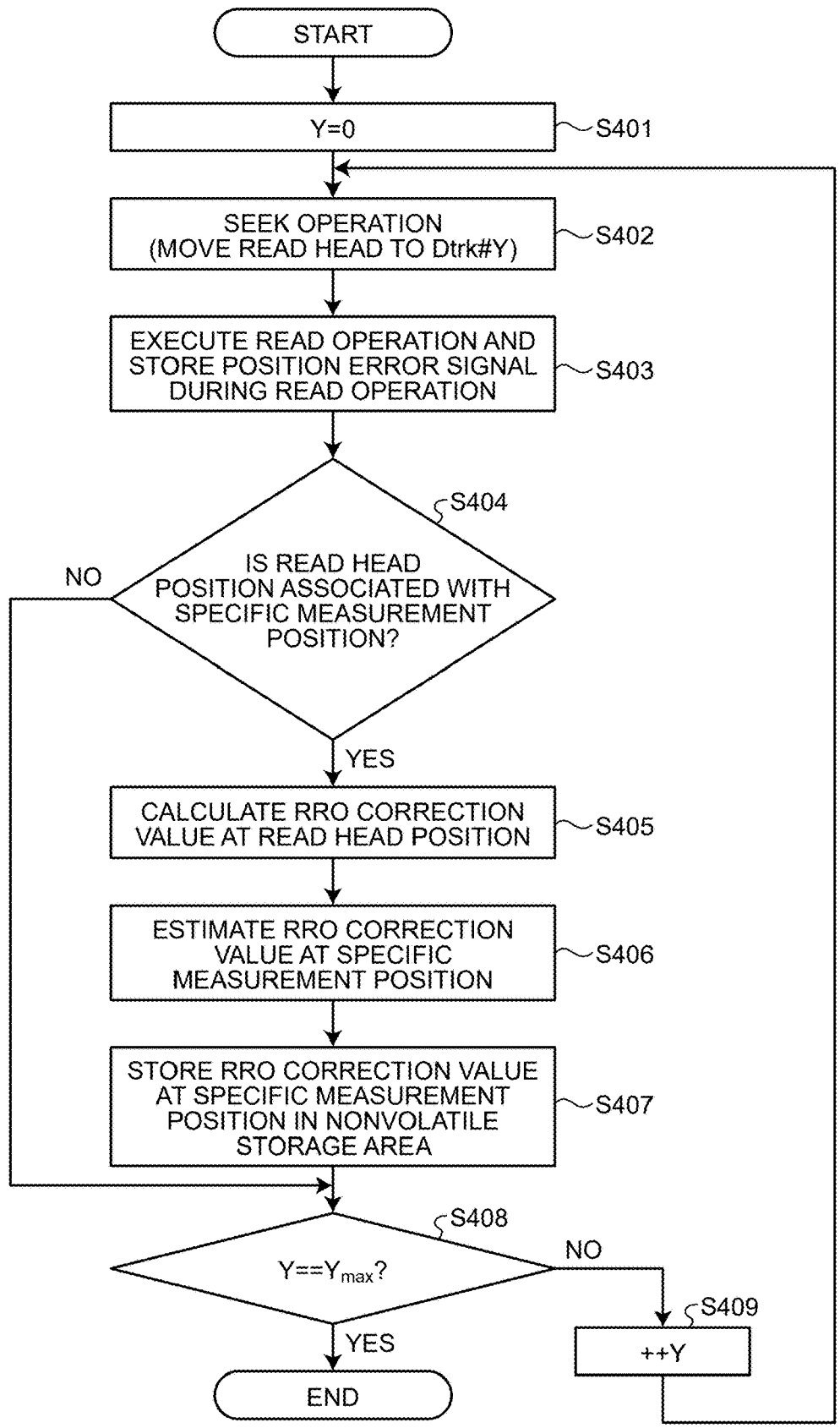
FIG. 10 is a flowchart illustrating exemplary operations in a read-all process of the magnetic disk apparatus according to the embodiment.

FIG. 10 is a flowchart illustrating exemplary operations in the read-all process of the magnetic disk apparatus 1 according to the embodiment.

First, the SoC 30 initializes a variable Y to zero (S401). Y is a variable that may take a numerical value within the range of the data track numbers, and is also an index used in the subsequent loop processing.

The SoC 30 executes a seek operation of moving the read head 22r to the data track DTrk #Y (S402).

The SoC 30 then executes a read operation of reading data from the data track DTrk #Y, and stores a position error signal during the read operation (S403).

In the processing of S403, the SoC 30 acquires the position error signal by demodulating the servo data when the read head 22r passes over the servo area SV. The SoC 30 continues the read operation while executing a tracking operation of keeping the read head 22r on the data track DTrk #Y based on the position error signal. During the read operation, the SoC 30 stores the acquired position error signals for one rotation of the magnetic disk 11. A storage area where the position error signal is stored is not limited to a specific storage area. In one example, the SoC 30 stores the position error signal in the DRAM 29.

Subsequently, the SoC 30 determines whether a read head position during the read operation with respect to the data track DTrk #Y, namely, the data track DTrk #Y is correlated with a specific measurement position (S404).

In a case where the read head position during the read operation with respect to the data track DTrk #Y is correlated with the specific measurement position (S404: Yes), the SoC 30 calculates an RRO correction value at the read head position (S405). The SoC 30 calculates RRO correction value in each of the servo areas SV for one rotation of the magnetic disk 11.

Subsequently, the SoC 30 estimates an RRO correction value at the specific measurement position correlated with the read head position by interpolation using the RRO correction value obtained by the calculation in the processing of S405 (S406). Also in the processing of S406, the SoC 30 estimates the RRO correction value in each of the servo areas SV for one rotation of the magnetic disk 11.

The SoC 30 stores the RRO correction value in each of the servo areas SV for one rotation of the magnetic disk 11 at the specific measurement position in a nonvolatile storage area (S407). As described above, the nonvolatile storage area as a storage destination may be the servo area SV of the magnetic disk 11, the data area DA, or the FROM 28.

In a case where the read head position during the read operation with respect to the data track DTrk #Y is not correlated with any specific measurement position (S404: No) or after the processing of S407, the SoC 30 determines whether Y is equal to $Y_{max}$ (S408).

In a case where Y is not equal to $Y_{max}$ (S408: No), the SoC 30 increments the value of Y by one (S409), and the control transitions to S402. In a case where Y is equal to $Y_{max}$ (S408: Yes), the read-all process is completed.

Note that the SoC 30 uses the RRO correction values measured by the RRO learning process during the seek operation and the tracking operation in positioning in the write-all process (for example, processing of S303 to S304 in FIG. 9) and positioning in the read-all process (for example, processing of S403 to S404 in FIG. 10). However, in the RRO learning process, the measurement of the RRO correction value at the specific measurement position is skipped. Therefore, the SoC 30 may estimate the RRO correction value at the specific measurement position by interpolation and use the RRO correction value obtained by the estimation in the positioning in the write-all process and the positioning in the read-all process.

FIG. 11 is a view for describing a method of estimating the RRO correction value at the specific measurement position in the write-all process and the read-all process of the magnetic disk apparatus 1 according to the embodiment.

In the example illustrated in FIG. 11, in the write-all process or the read-all process, the SoC 30 estimates the RRO correction value of each of the measurement positions #1, #4, #10, and #13 as the specific measurement positions, by linear interpolation of RRO correction values at two adjacent measurement positions.

The SoC 30 estimates the RRO correction values of the measurement positions #4 and #13 by the above method, and uses the RRO correction values obtained by the estimation in the processing of S303 to S304 of FIG. 9. In addition, the SoC 30 estimates the RRO correction values of the measurement positions #1 and #10 by the above method, and uses the RRO correction values obtained by the estimation in the processing of S403 to S404 of FIG. 10.

In the processing of measuring the RRO correction value of the specific measurement position (for example, the processing of S305 to S306 in FIG. 9 or the processing of S405 to S406 in FIG. 10), the SoC 30 updates the RRO correction value of the specific measurement position.

In this manner, by estimating the RRO correction value of the specific measurement position and using the estimated RRO correction value for the positioning in the write-all process or the read-all process, it is possible to suppress deterioration of positioning accuracy in the write-all process or the read-all process due to the skipping of the measurement of the RRO correction value of the specific measurement position in the RRO learning process.

In the example described above, the measurement positions are arranged at equal intervals. The measurement positions are not necessarily arranged at equal intervals.

FIG. 12 is a view for describing another example of arrangement of multiple measurement positions according to the embodiment.

In the example illustrated in FIG. 12, a read head position during a write operation is set as a reference position, and a measurement position is arranged at a position separated from the reference position by a predetermined distance $l_{pos}$ in the ID direction and a position separated from the reference position by the predetermined distance $l_{pos}$ in the OD direction.

In FIG. 12, as the multiple data tracks, data tracks DTrk #0 to DTrk #2 are arranged at equal intervals. Additionally, two measurement positions #0 and #1 with a read head position Pw10 during a write operation with respect to the data track DTrk #0 as a reference position are set. Two measurement positions #2 and #3 with a read head position Pw11 during a write operation with respect to the data track DTrk #1 as a reference position are set. Two measurement positions #4 and #5 with a read head position Pw12 during a write operation with respect to the data track DTrk #2 as a reference position are set.

In a read operation with respect to the data track DTrk #0, a tracking operation is executed such that the read head 22r moves along DTrk #0 (a read head position Pr10). In a read operation with respect to the data track DTrk #1, a tracking operation is executed such that the read head 22r moves along DTrk #1 (a read head position Pr11). In the read operation with respect to the data track DTrk #2, a tracking operation is executed such that the read head 22r moves along DTrk #2 (a read head position Pr12).

Thus, the read head positions Pw10, Pw11, and Pw12 are included in the read head position group in the write-all process, and the read head positions Pr10, Pr11, and Pr12 are included in the read head group in the read-all process.

Here, the measurement position #1 coincides with the read head position Pr11. In addition, the measurement position #3 coincides with the read head position Pr12. Thus, the SoC 30 determines that the measurement positions #1 and #3 are specific measurement positions, and skips measurement of RRO correction values at the measurement positions #1 and #3 in the RRO learning process. The SoC 30 performs the measurement of the RRO correction values at the measurement positions #1 and #3 in the read-all process.

Note that, also in the example illustrated in FIG. 12, in a case where a distance between a measurement position and a read head position closest to the measurement position in the read head position group in the write-all process or the read head position group in the read-all process is equal to or smaller than the threshold Dth, the SoC 30 may determine that the measurement position is the specific measurement position.

As described above, the multiple measurement positions are set in the radial direction of the magnetic disk 11 according to the embodiment. Those measurement positions include the specific measurement position. The SoC 30 executes the RRO learning process (for example, see S101 in FIG. 7), and executes the write-all process and the read-all process after the RRO learning process (see, for example, S102 and S103 in FIG. 7). In the RRO learning process, the SoC 30 measures the RRO correction value at each of the measurement positions excluding the specific measurement position among the measurement positions, and does not measure the RRO correction value, namely, skips measurement of the RRO correction value at the specific measurement position (for example, see FIG. 8). The measurement of an RRO correction value at one measurement position includes moving the magnetic head 22 to position the read head 22r at the one measurement position (see, for example, S204 in FIG. 8), acquiring a position error signal by the read head 22r while keeping the read head 22r on the one measurement position (see, for example, S205 in FIG. 8), and calculating the RRO correction value at the one measurement position based on the position error signal (see, for example, S206 in FIG. 8). In the write-all process and the read-all process, the SoC 30 includes acquiring the position error signal by the read head 22r at the time of accessing the data tracks (see, for example, S303 in FIGS. 9 and S403 in FIG. 10), and calculating the RRO correction value at the specific measurement position based on the position error signal (see, for example, S305 and S306 in FIG. 9 and S405 and S406 in FIG. 10).

In this manner, in the RRO learning process, the seek operation of the magnetic head 22 and the tracking operation for one cycle of the data track are omitted (skipped) for the specific measurement position. Then, the RRO correction value at the specific measurement position is measured after the write operation or the read operation in the subsequent process (the write-all process or the read-all process) of the RRO learning process. Therefore, the time required for measuring the RRO correction values at all the measurement positions is shortened. As a result, the efficiency of the RRO correction value measurement is improved.

In addition, according to the embodiment, in a case where a distance between a measurement position and a read head position closest to the measurement position in the read head position group in the write-all process or the read head position group in the read-all process is smaller than a threshold Dth, the SoC 30 determines that the measurement position is the specific measurement position. In a case where a distance between a measurement position and a read head position closest to the measurement position in the read head position group in the write-all process or the read head position group in the read-all process is larger than the threshold Dth, the SoC 30 determines that the measurement position is not the specific measurement position.

Moreover, according to the embodiment, the SoC 30 calculates the RRO correction value at the specific measurement position based on the position error signal acquired from the read head position closest to the specific measurement position in the read head position group in the write-all process or the read head position group in the read-all process at the time of accessing one of the data tracks in the write-all process or the read-all process (see, for example, S303 to S306 in FIG. 9 and S403 to S406 in FIG. 10).

Thus, the time required for measuring the RRO correction values at all the measurement positions is shortened. The efficiency of the RRO correction value measurement is improved.

According to the embodiment, the SoC 30 determines the specific measurement position based on the read head position table that is information in which the read head position group in the write-all process and the read head position group in the read-all process are recorded.

Note that a method of determining the specific measurement position is not limited to a method using the read head position table. In a case where the measurement positions are located at equal intervals, the SoC 30 may divide numerical information indicating a read head position of each of the read head position group in the write-all process and the read head position group in the read-all process by the interval between the measurement positions, and determine the specific measurement position based on a value obtained by the division.

In addition, according to the embodiment, the SoC 30 estimates the RRO correction value at the specific measurement position by using RRO correction values of at least two of measurement positions that are not the specific measurement positions. Then, the SoC 30 performs positioning of the magnetic head 22 by using the RRO correction value obtained by the estimation in the write operation or the read operation with respect to the data tracks in the write-all process or the read-all process.

Therefore, it is possible to suppress the deterioration of positioning accuracy in the write-all process or the read-all process due to the skipping of measurement of the RRO correction value at the specific measurement position in the RRO learning process.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
   a magnetic disk on which multiple first positions are set in a radial direction and multiple tracks are provided, the multiple first positions being positions at which repeatable run-out (RRO) correction values are measured, the multiple first positions including multiple second positions and a third position different from the multiple second positions;
   a magnetic head including a write head configured to perform write access to the magnetic disk and a read head configured to perform read access to the magnetic disk; and
   a controller configured to
      execute a first process in which an RRO correction value is measured at each of the multiple second positions and measurement of an RRO correction value at the third position is skipped, the measuring of the RRO correction value at each of the multiple second positions including, for each second position,
         moving the magnetic head to place the read head at a fourth position being one of the multiple second positions,
         acquiring a first position error signal by the read head while keeping the read head at the fourth position, and
         calculating an RRO correction value at the fourth position based on the first position error signal, and
      execute, after the first process, a second process of performing the write access or the read access to the multiple tracks, the second process including
         acquiring a second position error signal by the read head during the write access or the read access, and
         calculating an RRO correction value at the third position based on the second position error signal.

2. The magnetic disk apparatus according to claim 1, wherein the controller is configured to
   determine that one of the multiple first positions is one of the multiple second positions, the one of the multiple first positions being a first position whose distance to a closest one of multiple fifth positions is larger than a threshold, the multiple fifth positions each being a position of the read head during access to one of the multiple tracks, and
   determine that one of the multiple first positions is the third position, the one of the multiple first positions being a first position whose distance to a closest one of multiple fifth positions is smaller than the threshold.

3. The magnetic disk apparatus according to claim 2, wherein the second position error signal is a position error signal acquired from a sixth position during access to one of the multiple tracks in the second process, the sixth position being one of the fifth positions closest to the third position.

4. The magnetic disk apparatus according to claim 2, wherein the controller is configured to perform the determination of the multiple second positions and the third position based on information in which the multiple fifth positions are recorded.

5. The magnetic disk apparatus according to claim 1, wherein the controller is configured to
   estimate the RRO correction value at the third position by using RRO correction values of two or more of the multiple second positions, and
   perform positioning of the magnetic head by using the estimated RRO correction value at the third position during the access in the second process.

6. The magnetic disk apparatus according to claim 2, wherein the controller is configured to
   estimate the RRO correction value at the third position by using RRO correction values of two or more of the multiple second positions, and
   perform positioning of the magnetic head by using the estimated RRO correction value at the third position during the access in the second process.

7. The magnetic disk apparatus according to claim 3, wherein the controller is configured to
   estimate the RRO correction value at the third position by using RRO correction values of two or more of the multiple second positions, and
   perform positioning of the magnetic head by using the estimated RRO correction value at the third position during the access in the second process.

8. The magnetic disk apparatus according to claim 4, wherein the controller is configured to
   estimate the RRO correction value at the third position by using RRO correction values of two or more of the multiple second positions, and
   perform positioning of the magnetic head by using the estimated RRO correction value at the third position during the access in the second process.

9. A method of controlling a magnetic disk apparatus, the magnetic disk apparatus including a magnetic disk and a magnetic head, the magnetic disk being a magnetic disk on which multiple first positions are set in a radial direction and multiple tracks are provided, the multiple first positions being positions at which repeatable run-out (RRO) correction values are measured, the multiple first positions including multiple second positions and a third position different from the multiple second positions, the magnetic head including a write head serving to perform write access to the magnetic disk and a read head serving to perform read access to the magnetic disk, the method comprising:
   executing a first process in which an RRO correction value is measured at each of the multiple second positions and measurement of an RRO correction value at the third position is skipped, the measuring of the RRO correction value at each of the multiple second positions including, for each second position,
      moving the magnetic head to place the read head at a fourth position being one of the multiple second positions,
      acquiring a first position error signal by the read head while keeping the read head at the fourth position, and calculating an RRO correction value at the fourth position based on the first position error signal; and executing, after the first process, a second process of performing the write access or the read access to the multiple tracks, the second process including acquiring a second position error signal by the read head during the write access or the read access, and calculating an RRO correction value at the third position based on the second position error signal.

10. The method according to claim 9, further comprising:

determining that one of the multiple first positions is one of the multiple second positions, the one of the multiple first positions being a first position whose distance to a closest one of multiple fifth positions is larger than a threshold, the multiple fifth positions each being a position of the read head during access to one of the multiple tracks; and determining that one of the multiple first positions is the third position, the one of the multiple first positions being a first position whose distance to a closest one of multiple fifth positions is smaller than the threshold.

11. The method according to claim 10, wherein the second position error signal is a position error signal acquired from a sixth position during access to one of the multiple tracks in the second process, the sixth position being one of the fifth positions closest to the third position.

12. The method according to claim 10, further comprising performing the determination of the multiple second positions and the third position based on information in which the multiple fifth positions are recorded.

13. The method according to claim 9, further comprising:

estimating the RRO correction value at the third position by using RRO correction values of two or more of the multiple second positions; and performing positioning of the magnetic head by using the estimated RRO correction value at the third position during the access in the second process.

14. The method according to claim 10, further comprising:

estimating the RRO correction value at the third position by using RRO correction values of two or more of the multiple second positions; and performing positioning of the magnetic head by using the estimated RRO correction value at the third position during the access in the second process.

15. The method according to claim 11, further comprising:

estimating the RRO correction value at the third position by using RRO correction values of two or more of the multiple second positions; and performing positioning of the magnetic head by using the estimated RRO correction value at the third position during the access in the second process.

16. The method according to claim 12, further comprising:

estimating the RRO correction value at the third position by using RRO correction values of two or more of the multiple second positions; and performing positioning of the magnetic head by using the estimated RRO correction value at the third position during the access in the second process.

* * * * *